(12) United States Patent
Stadlbauer et al.

(10) Patent No.: US 9,404,833 B2
(45) Date of Patent: Aug. 2, 2016

(54) MACHINE-IMPLEMENTED METHOD FOR OBTAINING DATA FROM A NONLINEAR DYNAMIC REAL SYSTEM DURING A TEST RUN

(75) Inventors: Markus Stadlbauer, Vienna (AT); Christoph Hametner, Vienna (AT); Stefan Jakubek, Vienna (AT); Thomas Winsel, Bad Groenenbach (DE); Nikolaus Keuth, Graz (AT)

(73) Assignee: AVL List GmbH, Graz (AT)

( * ) Notice: Subject to any disclaimer, the term of this patent is extended or adjusted under 35 U.S.C. 154(b) by 210 days.

(21) Appl. No.: 14/111,092

(22) PCT Filed: May 30, 2012

(86) PCT No.: PCT/EP2012/060156
§ 371 (c)(1),
(2), (4) Date: Nov. 13, 2013

(87) PCT Pub. No.: WO2012/163972
PCT Pub. Date: Dec. 6, 2012

(65) Prior Publication Data
US 2014/0067197 A1 Mar. 6, 2014

(30) Foreign Application Priority Data
May 31, 2011 (AT) .................................. A0804/2011

(51) Int. Cl.
*G06N 3/08* (2006.01)
*G06N 7/08* (2006.01)
(Continued)

(52) U.S. Cl.
CPC .............. *G01M 17/00* (2013.01); *G05B 13/042* (2013.01); *G05B 23/0256* (2013.01); *G06N 3/08* (2013.01); *G06N 7/08* (2013.01)

(58) Field of Classification Search
CPC .................................. G06N 3/08; G06N 7/08
USPC ............................................................ 706/25
See application file for complete search history.

(56) References Cited

U.S. PATENT DOCUMENTS 8,065,022 B2  11/2011 Minto et al.

FOREIGN PATENT DOCUMENTS

DE  102008055593   7/2009
JP    2008249610  10/2008
(Continued)

OTHER PUBLICATIONS

Józef Korbicz ("Fault Diagnosis of Non-Linear Dynamical Systems Using Analytical and Soft Computing Methods" 2007.*
(Continued)

*Primary Examiner* — Lut Wong
(74) *Attorney, Agent, or Firm* — Dykema Gossett PLLC (57) ABSTRACT

A method for obtaining data from a nonlinear dynamic real system during a test run, for instance an internal combustion engine, a drivetrain, or parts thereof, a sequence of dynamic excitation signals is generated according to an initial design and a system output is measured. To enable the quick and precise generation of experimental designs for global measurement, modeling, and optimization of a nonlinear dynamic real system, a sequence of dynamic excitation signals was generated by generating a design with a sequence of excitation signals, obtaining output data by feeding said sequence into a model for the real system, determining a criterion for the information content of the complete design of experiment sequence, varying the sequence, obtaining new output data by feeding said modified sequence into the model, determining again said criterion, iterating until said criterion improves, and using the improved sequence of excitation signals for the real system.

7 Claims, 3 Drawing Sheets

(51) Int. Cl.
*G01M 17/00* (2006.01)
*G05B 13/04* (2006.01)
*G05B 23/02* (2006.01)

(56) References Cited

FOREIGN PATENT DOCUMENTS

| JP | 201086405 | 4/2010 |
|---|---|---|
| JP | 2011065553 | 3/2011 |
| WO | 03088067 | 10/2003 |

OTHER PUBLICATIONS

Versyck et al ("Introducing optimal experimental design in predictive modeling: A motivating example" 1999).*

Catania et al ("Optimal sampling for the estimation of dispersion parameters in soil columns using an Iterative Genetic Algorithm" 2009).*

Hong et al ("Model selection approaches for non-linear system identification: a review" 2008) discloses various models for non-linear dynamic system.*

L. Pronzato, "Optimal experimental design and some related control problems," Automatica, 44(2):303-325, Feb. 2008.

M. Deflorian et al., "Online Dynamic Black Box Modelling and Adaptive Experiment Design in Combustion Engine Calibration," 6$^{th}$ IFAC Symposium Advances in Automotive Control, Munich, Germany, Jul. 12-14, 2010.

L. Gerencser et al., "Identification of ARX systems with non-statutory inputs-asymptotic analysis with application to adaptive input design," Automatica, 45:623-633, Mar. 2009.

D. Cohn, "Neural Network Exploration Using Optimal Experiment Design," Neural Networks, 9(6):1071-1083, 1996.

T. M. Souders et al., "Cutting the high cost of testing," IEEE Spectrum, vol. 28, No. 3, pp. 48-51, Mar. 1991.

L. Dobos et al., "Optimal Experiment Design Techniques Integrated with Time-series Segmentation," 8$^{th}$ IEEE Intl. Symposium on Applied Machine Intelligence and Informatics, Jan. 2010.

English Abstract of JP 201086405.

English Abstract of JP 2011065553.

English Abstract of JP 2008249610.

\* cited by examiner

MACHINE-IMPLEMENTED METHOD FOR OBTAINING DATA FROM A NONLINEAR DYNAMIC REAL SYSTEM DURING A TEST RUN

TECHNICAL FIELD

The present disclosure is related to a machine-implemented method for obtaining data from a nonlinear dynamic real system during a test run, for instance an internal combustion engine, a drive-train or parts thereof.

BACKGROUND

There is an ever-increasing need in the automotive field for efficient and accurate models since the calibration of the motor control system is becoming increasingly complex, and also increasingly expensive due to stricter and stricter regulatory requirements. The principal requirements for good models are good measurement data and an appropriately selected measurement design. As a result, the number of measurements and thus also the measurement period increases. However, since time on the test stand is very expensive, the need arises for effective experimental designs that minimize the number of measurement points, cover the test space as effectively as possible, while at the same time not qualitatively degrading the models trained using these data. These models are then used to optimize and calibrate ECU structures, or also to make decisions regarding components.

Optimal experiment design (OED) optimizes the information content, which is demanded to properly parametrize a model with as little effort as possible, as explained in L. Pronzato "Optimal experimental design and some related control problems." Automatica, 44(2):303-325, 2008. Dynamic excitation signals are characterized by their spacial distribution and their temporal behaviour. For the identification of linear dynamic systems pseudo random binary signals (PRBS) are commonly used, see G. C. Goodwin and R. L. Payne "Dynamic System Identification: Experiment Design and Data Analysis" Academic Press Inc., New York, 1977. When it comes to nonlinear dynamic systems amplitude modulated pseudo random binary signals (APRBS) are well established as excitation signals, in order to track the nonlinear process characteristics, see e.g. O. Nelles "Nonlinear System Identification: From Classical Approaches to Neural Networks and Fuzzy Models" Springer, Berlin, 2001. In contrast to these very general methodologies for the experiment design, model based design of experiments (DoE) is more specifically suited to the process to be identified in that a prior process model or at least a model structure is used to maximize the information gained from experiments.

Figure 1:
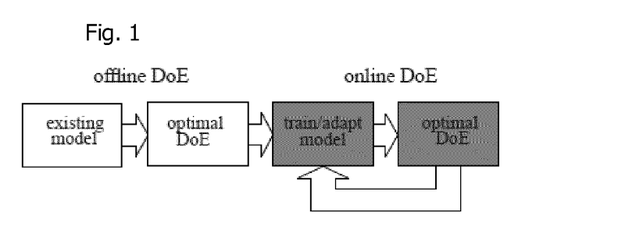
FIG. 1 shows an offline and online DoE procedure.

Real processes are subject to restrictions, which basically affect system inputs and outputs. E.g. the manipulated and the control variables must not exceed the feasible range, in order to provide specified operational conditions or to prevent damage from the plant. For the consideration of system output constraints in the DoE a model is required, which predicts the output dynamics. Model based DoE can also be used for online experiment design, where the model is continuously adapted to incoming data and the DoE is generated sequentially for a certain number of future system inputs. Such a procedure is commonly called online or adaptive DoE and is depicted in FIG. 1. Explanations can be found in Online Dynamic Black Box Modelling and Adaptive Experiment Design in Combustion Engine Calibration, Munich, Germany, 2010 and in László Gerncsér, Hakan Hjalmarsson and Jonas Martensson "Identification of arx systems with nonstationary inputs—asymptotic analysis with application to adaptive input design"Automatica, 45:623-633, March 2009.

SUMMARY

The purpose of the method presented here is to generate experimental designs that are matched to typical applications in engines or drive train development, and calibration of the engine control unit (ECU) or transmission control unit (TCU). The method is intended to enable the quick and precise generation of experimental designs for global measurement, modeling, and optimization of a nonlinear dynamic real system, for example, of an internal combustion engine, a drive train, or subsystems thereof, as well as the global optimization thereof while taking into account experimental limits and additional criteria.

In order to achieve this purpose, the method described in the introduction is characterized by the characterizing part of claim 1. Preferred embodiments of that basic concept are given in the dependent claims.

The main advantages of model based DoE in contrast to conventional DoE techniques are that the model is used to optimize the DoE such that the experiments are as effective as possible, the incorporation of various constraints, including constraints on the system output, and the application in an online DoE is possible.

The invention is explained in more detail in the following specification, based on preferred examples and relating to the attached drawing figures.

DETAILED DESCRIPTION

In the following specification it is explained, how to elaborate an optimal DoE batch procedure with compliance to input and output constraints using a dynamic multilayer perceptron (MLP) network for the representation of the real nonlinear system under consideration, i.e. the combustion engine, drive train or the like that is to be analysed in a test run e.g. on a test stand. It seeks to optimize the Fisher information matrix of a MLP and is thus applicable to a wide class of dynamic systems. In literature, several methods for OED based on neural networks are proposed, which make use of candidate sets for the optimization of excitation signals. In D. A. Cohn "Neural network exploration using optimal experiment design" Neural Networks, 9(6):1071-1083, 1996 OED is applied to learning problems by allowing the learner at each time step to select a new system input from a candidate set. The selection of the new input is done with consideration of either static or dynamic input constraints by means of minimizing the expectation value of the learners mean squared error. It is further known that the D-optimality criterion is applied for the reduction of training data for global dynamic models based on dynamic neural networks. Also a locally sequential D-optimal DoE was proposed and formulated as a model predictive control problem by means of optimization over a set of feasible system inputs, which are based on the temporal progression of a given APRBS. The use of MLP networks for model based DoE is inspired by the above mentioned publications and combined with a gradient algorithm for the enhancement of excitation signals. As opposed to most state of the art approaches in this paper the optimization of the design criterion is carried out analytically so that no candidate set is required. The simultaneous optimization of both the temporal and spatial progression of the excitation signal and the compliance to input and output constraints is proposed. In this context dynamic model based DoE has to take into account the inherent effect of every excitation signal on all future system outputs so that its influence on the Fisher information matrix as well as the adherence to output constraints can become very sophisticated.

As the nonlinear model structure, MLP networks are chosen as nonlinear model structure, since they belong to the class of universal approximators. Another nonlinear model structure for use according to the present invention are Local Model Networks (LMN) or Takagi-Sugeno fuzzy models.

Figure 2:
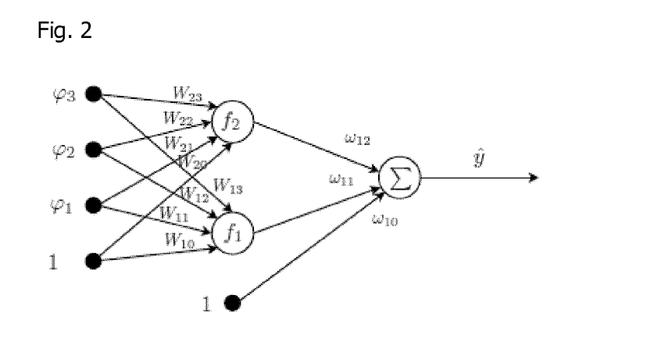
FIG. 2 shows a two layer feedforward perceptron with three inputs, two hidden units and one output.

More specifically, multiple input single output (MISO) MLP networks are used, as shown in FIG. 2. The free model parameters are given by the input weights W and the output weights ω, which can be combined to the parameter vector θ.

$$W = \begin{bmatrix} W_{10} & \cdots & W_{1n_\varphi} \\ \vdots & \ddots & \vdots \\ W_{n_h 0} & \cdots & W_{n_h n_\varphi} \end{bmatrix} \tag{1}$$

$$\omega = [\omega_{10} \ \cdots \ \omega_{1n_h}]^T \tag{2}$$

$$\theta = [\omega_{10} \ \cdots \ \omega_{1n_h} \ W_{10} \ \cdots \ W_{1n_\varphi} \ \cdots \ W_{n_h 0} \ \cdots \ W_{n_h n_\varphi}]^T \tag{3}$$

The model output $\hat{y}$ is calculated as a weighted sum of nonlinear sigmoid activation functions $f_i$ in the hidden layer. There are $n\phi$ model inputs $\phi i$, which constitute the regression vector $\phi$.

$$f_i(h_i) = \frac{1}{1 + e^{-h_i}} \tag{4}$$

$$\varphi = [\varphi_1 \ \cdots \ \varphi_{n_\varphi}]$$

The approximation capability of the MLP network is determined by the number of hidden units $n_h$. In vector matrix notation the input to the hidden layer h and the output of the hidden layer o are given by:

$$h = W \begin{bmatrix} 1 \\ \varphi^T \end{bmatrix} \tag{5}$$

$$o(h) = \begin{bmatrix} f_1(h_1) \\ \vdots \\ f_{n_h}(h_{n_h}) \end{bmatrix}$$

The output of the MLP network is a nonlinear function $g(\phi,\theta)$, which depends on the regression vector $\phi$ and parameter vector $\theta$.

$$\hat{y} = g(\varphi, \theta) \tag{6}$$

$$= \omega^T \begin{bmatrix} 1 \\ o(h) \end{bmatrix} =$$

$$= \sum_{j=1}^{n_h} \omega_{1j} f_j \left( \sum_{l=1}^{n_\varphi} W_{jl}\varphi_l + W_{j0} \right) + \omega_{10}$$

Both the inputs to the hidden units and the output of the hidden layer contain the offset terms $W_{j0}$ and $\omega_{10}$. It is assumed that the system output of the real process y(k) is given by the model $\hat{y}(k,\theta)$ and some Gaussian error e(k) with zero mean and variance σ2:

$$y(k)=g(\phi(k),\theta)+e(k)=\hat{y}(k,\theta)+e(k) \tag{7}$$

Figure 3:
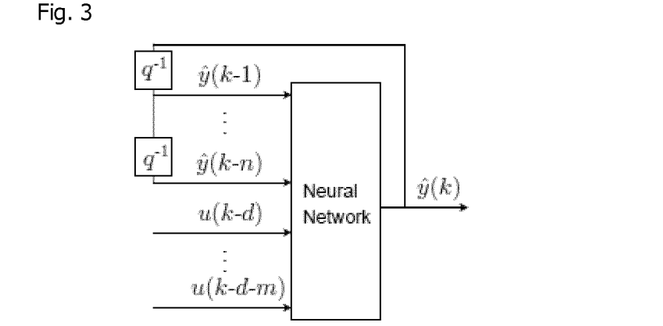
FIG. 3 depicts a NNOE structure with one single input u and deadtime d.

So far it is not specified whether the MLP network is used for static or dynamic systems. For the following, dynamic MLP networks in the output error (NNOE) configuration are considered. Then, the regression vector $\phi(k,\theta)$ at the k-th observation comprises of past network outputs $\hat{y}(k-i)$ with i=1 . . . n and past system inputs u(k−d−j+1) with j=1 . . . m and dead time d (see FIG. 3).

$$\phi(k,\theta)=[\hat{y}(k-1,\theta) \ldots \hat{y}(k-n,\theta)u_1(k-d) \ldots$$
$$u_1(k-d-m) \ldots u_{n_u}(k-d) \ldots u_{n_u}(k-d-m)] \tag{8}$$

It is assumed that the excitation signal U consists of N observations and $n_u$ different inputs. The measured system output y is given by:

$$U = [u_1 \ \ldots \ u_{n_u}] = \begin{bmatrix} u_1(1) & \cdots & u_{n_u}(1) \\ \vdots & \ddots & \vdots \\ u_1(N) & \cdots & u_{n_u}(N) \end{bmatrix} \tag{9}$$

The measured system output y is given by:

$$y = \begin{bmatrix} y(1) \\ \vdots \\ y(N) \end{bmatrix} \tag{10}$$

The network parameters θ have to be adjusted to the experimental input and output data. The training of the network weights is usually carried out with a standard Levenberg Marquardt algorithm, which is targeted to minimize a quadratic cost function $V_N(\theta)$ based on the prediction error $\epsilon(k)$:

$$V_N(\theta) = \frac{1}{2N} \sum_{k=1}^{N} (y(k) - \hat{y}(k, \theta))^2 = \frac{1}{2N} \sum_{k=1}^{N} \epsilon^2(k, \theta) \tag{11}$$

Optimal model based DoE is targeted to maximize the information content of experiments. For this purpose, an optimality criterion is optimized, which is usually derived from the Fisher information matrix. In this context, the process model in the form of a MLP network is necessary for the calculation of the Fisher information matrix. From a statistical point of view, the Fisher information matrix I gives a statement about the information content of data, in terms of the covariance of estimated parameters. Popular design criteria for model based DoE are the trace of $I^{-1}$ (A-optimality), the determinant of I (D-optimality) and the smallest eigenvalue of I (E-optimality).

Model based DoE can be applied if a model of a system already exists and only some parts of the system have been modified so that a similar behavior can be expected, if the system is operated in changed environmental conditions and if a model of a similar system is available.

The Fisher matrix is a statistical measure of the amount of information of the underlying data and its inverse gives the covariance matrix of the estimated model parameters θ. This matrix is the derivative of the model output with respect to the model parameters:

$$I = \frac{1}{\sigma^2} \sum_{k=1}^{N} \frac{\partial \hat{y}(k)}{\partial \theta} \frac{\partial \hat{y}(k)^T}{\partial \theta}$$

Popular design criteria for model based DoE use a scalar value of the Fisher matrix or of its inverse as objective function. In doing so, a measure for the information content is needed, in order to be able to optimize excitation signals. Since the Fisher information matrix gives statistical evidence about the information content of the underlying data and the covariance of the estimated parameters, respectively, it is a basis for common design criteria like A-, D- and E-optimality.

The Fisher information matrix depends on the parameter sensitivity vector $\psi(k)$, which describes the functional dependence of the model output on the model parameters:

$$\psi(k) = \frac{\partial \hat{y}(\varphi(k, \theta), \theta)}{\partial \theta} \qquad (12)$$

The Fisher information matrix comprises the parameter sensitivity vectors of all observations k=1 ... N according to $$I(\Psi) = \frac{1}{\sigma^2} \Psi^T \Psi, \qquad (13)$$

where the parameter sensitivity matrix W combines the parameter sensitivities for all observations:

$$\Psi = \begin{bmatrix} \psi^T(1) \\ \vdots \\ \psi^T(N) \end{bmatrix} \qquad (14)$$

The parameter sensitivity is separately obtained for the MLP output weights $\psi_\omega(k)$ and the input weights $\psi_W(k)$:

$$\psi_\omega(k) = \frac{\partial \hat{y}(\varphi(k, \theta), \theta)}{\partial \omega} = \begin{bmatrix} 1 \\ o(h(k)) \end{bmatrix} \qquad (15)$$

$$\psi_\omega(k) \in \mathbb{R}^{[1+n_h] \times 1} \qquad (16)$$

$$\Psi_W(k) = \frac{\partial \hat{y}(\varphi(k, \theta), \theta)}{\partial W} = \text{diag}\,(o'(h(k)))\tilde{\omega}[1\varphi(k, \theta)] \qquad (17)$$

$$\Psi_W(k) \in \mathbb{R}^{n_h \times [1+n_\varphi]} \qquad (18)$$

The output weight vector without bias term is indicated with $\tilde{\omega}$:

$$\tilde{\omega} = [\omega_{11} \ldots \omega_{1n_h}]^T \qquad (19)$$

$$o'(h(k)) = \left[\frac{\partial o_i(h_i(k))}{\partial h_i(k)}\right] i = 1 \ldots n_h \qquad (20)$$

$$o'(h(k)) = 1 - o(h(k)) \cdot o(h(k)), \qquad (21)$$

Here, o'(h(k) denotes a column vector, whose i-th element is given by the derivative of the i-th output of the hidden layer with respect to the i-th input to the hidden layer at the k-th observation. In (17) diag(o'(h(k)) indicates a diagonal matrix, whose entries are the elements of the vector o'(h(k)) and o denotes the Hadamard product.

Frequently used optimality criteria based on the Fisher information matrix are A-, D- and E-optimality. A-optimality is targeted to minimize the sum of the parameter variances. Therefore, the associated design criterion is based on the trace of $I^{-1}$:

$$J_A(\Psi) = Tr(I^{-1}(\Psi)) \qquad (22)$$

D-optimality uses the determinant of I, which is in contrast to A-optimality more sensitive to single parameter covariances, since the determinant equals the product of the eigenvalues. Moreover, D-optimality is invariant under any nonsingular reparametrization, which does not depend on the experiment.

$$J_D(\Psi) = \det(I(\Psi)) \qquad (23)$$

For the E-optimal design the smallest eigenvalue λmin of the Fisher information matrix is subject of maximization.

$$J_E(\Psi) = \lambda_{min}(I(\Psi)) \qquad (24)$$

The design criterion J can only be influenced by changing the system inputs $u_i(k)$. For the optimization of the design criterion, usually a candidate set of feasible inputs is generated, from which certain inputs are selected that optimize the design criterion.

The proposed method for model based DoE realizes the minimization of (22) and the maximization of (23) and (24) by an analytical calculation of optimized excitation signals with consideration of input and output constraints.

Generally, the enhancement of excitation signals is targeted to optimize the design criterion with simultaneous adherence to constraints. Mathematically, the optimization problem with consideration of input, input rate and output constraints is stated as:

$$A - \text{optimality.} J_A \to \min_{u_i(k)} \qquad (25)$$

$$D - \text{and } E - \text{ptimality.} J_D, J_E \to \max_{u_i(k)} \qquad (26)$$

$$\text{Input constraint } u_{min} \leq u_i(k) \leq u_{max} \qquad (27)$$

$$\text{Rate constraint } \Delta u_{min} \leq u_i(k+1) - u_i(k) \leq \Delta u_{max} \qquad (28)$$

$$\text{Output constraint } y_{min} \leq \hat{y}(k) \leq y_{max} \qquad (29)$$

The enhancement of the design criterion J poses a nonlinear optimization problem, for which different optimization methods are available. For the enhancement of the design criterion of linear dynamic systems, a gradient algorithm is known. For use in the present invention, an iterative gradient descent method is used to optimize the excitation signals of nonlinear dynamic systems. The proposed method for the analytical calculation of optimized excitation signals is done in two steps. First, the gradient of the design criterion with respect to the dynamic system inputs is determined, and second, the system inputs are updated recursively and input and output constraints are observed.

The optimization is based on the calculation of the gradient of the objective function represented by the design criterion with respect to the dynamic system inputs. In each iteration, the excitation signal is updated such that the design criterion is improved while the compliance to constraints is accomplished.

The derivative of the design criterion J with respect to the i-th system input $u_i(k)$ is calculated by the use of the chain rule in three steps:

$$\frac{dJ(\Psi)}{du_i(k)} = \sum_{l=1}^{N} \underbrace{\frac{dJ(\Psi)}{d\psi^T(l)}}_{(i)} \underbrace{\frac{d\psi(l)}{d\varphi(l,\theta)}}_{(ii)} \underbrace{\frac{d\varphi^T(l,\theta)}{du_i(k)}}_{(iii)} \quad (30)$$

Ad(i): First the derivative of the design criterion with respect to the parameter sensitivity vector for the I-th observation $\psi(I)$ is required. For A-optimality and D-optimality the result is given by:

$$\frac{dJ_A(\Psi)}{d\psi^T(l)} = -2s(l)\Psi[\Psi^T\Psi]^{-2} \quad (31)$$

$$\frac{dJ_D(\Psi)}{d\psi^T(l)} = 2s(l)J_D(\Psi)\Psi[\Psi^T\Psi]^{-1} \quad (32)$$

$$s(l) = [0 \ldots 1 \ldots 0] \in \mathbb{R}^{1\times N} \quad (33)$$

Where s(I) represents the single entry vector, which equals 1 at the I-th position and 0 elsewhere. E-optimality requires the calculation of the derivative of the smallest eigenvalue of the Fisher matrix $\lambda$min with respect to the parameter sensitivity vector $\psi(I)$, which results in:

$$\frac{dJ_E(\Psi)}{d\psi(l)^T} = 2s(l)\Psi x_{min} x_{min}^T \quad (34)$$

Here, $x_{min}$ indicates the eigenvector of the smallest eigenvalue $\lambda$min:

$$I x_{min} = \lambda_{min} x_{min} \quad (35)$$

In (31) and (32) the inverse of the Fisher matrix appears. Therefore, the Fisher matrix must be regular, in order to be invertible. It was already shown that a singular Fisher information matrix based on a MLP network can be made regular by the elimination of redundant neurons.

Ad(ii): The derivative of the parameter sensitivity vector for the output weights $\psi_\omega(I)$ with respect to the regression vector $\phi(I,\theta)$ is given by:

$$\frac{d\psi_w(l)}{d\varphi(l,\theta)} = \begin{bmatrix} 0 \\ diag(o'(h(l)))\tilde{W} \end{bmatrix} \in \mathbb{R}^{[1+n_h]\times n_\varphi} \quad (36)$$

Here, the input weights without bias terms is indicated by $\tilde{W}$:

$$\tilde{W} = \begin{bmatrix} W_{11} & \cdots & W_{1n_\varphi} \\ \vdots & \ddots & \vdots \\ W_{n_h 1} & \cdots & W_{n_h n_\varphi} \end{bmatrix} \quad (37)$$

And the derivative of the parameter sensitivity matrix for the input weights $\psi_W(I)$ with respect to the i-th component of the regression vector $\phi_i(I,\theta)$ is determined as follows:

$$\frac{d\Psi_W(l)}{d\varphi_i(l,\theta)} = \quad (38)$$

$$diag(o'(h(l)))\tilde{\omega}[0e_i] + \begin{pmatrix} (diag(o''(h(l)))\tilde{\omega}) \cdot \\ (\tilde{W}s(i)^T) \end{pmatrix} [1\varphi(l,\theta)]$$

$$\frac{d\Psi_W(l)}{d\varphi_i(l,\theta)} \in \mathbb{R}^{n_h \times [1+n_\varphi]} \quad (39)$$

Where, o''(h(I)) indicates a column vector, whose i-th entry is given by the second derivative of the output of the hidden layer with respect to the i-th input to the hidden layer at the k-th observation:

$$o''(h(l)) = \left[\frac{\partial^2 o_i(h_i(k))}{\partial h_i^2(k)}\right] i = 1 \ldots n_h \quad (40)$$

$$o''(h(l)) = -2o(h(l)) \cdot o'(h(l)) \quad (41)$$

Here $e_i$ denotes the direction vector into the i-th component of $\phi(I, \theta)$, and s(i) is again the single entry vector.

$$e_i = [0 \ldots 1 \ldots 0] \in R^{1\times n_\phi} \quad (42)$$

$$s_i = [0 \ldots 1 \ldots 0] \in R^{1\times n_\phi} \quad (43)$$

Ad(iii) For dynamic autoregressive systems the regression vector not only depends on past system inputs but also on model outputs. Therefore the derivative of $\phi'(I+1,\theta)$ with respect to $u_i(I-j)$ requires the calculation of the derivative of past model outputs $\hat{y}(I, \theta)$ with respect to $u_i(I-j)$. Dynamic system inputs $u_i(k)$ have on the one hand a direct impact on the model output and on the other hand an indirect influence via the past n model outputs. Taking this fact into account and using the chain rule the derivative of $\hat{y}(I, \theta)$ with respect to $u_i(I-j)$ is given by:

$$\frac{d\hat{y}(l,\theta)}{du_i(l-j)} = \frac{\partial g(\varphi(l,\theta),\theta)}{\partial \hat{y}(l-1,\theta)} \underbrace{\frac{d\hat{y}(l-1,\theta)}{du_i(l-j)}}_{recursive\ calculation} + \quad (44)$$

$$\ldots + + \frac{\partial g(\varphi(l,\theta),\theta)}{\partial \hat{y}(l-n,\theta)} \frac{d\hat{y}(l-n,\theta)}{du_i(l-j)} + \frac{\partial g(\varphi(l,\theta),\theta)}{\partial u_i(l-j)}$$

$$j \geq 1 \ k = l - j \quad (45)$$

In the next time step the result of (44) is used for the calculation of the derivative $\hat{y}(I+1, \theta)$ with respect to $u_i(I-j)$. In a recursive procedure all model outputs, which are needed for the regression vector at the I-th observation are differentiated. The derivative of $g(\phi(I, \theta), \theta)$ with respect to the elements of the regression vector is given in vector matrix notation by: in (44)

$$\frac{\partial g(\varphi(l,\theta))}{\partial \varphi(l,\theta)} = \tilde{\omega}^T diag(o'(h(l)))\tilde{W} \in \mathbb{R}^{1\times n_\varphi} \quad (46)$$

The derivative of all system inputs uj(s), which are used in the regression vector φ(I, θ) with respect to $u_i(k)$ is calculated by:

$$\frac{du_j(s)}{d(k)} = \delta_{ij}\delta_{ks} 1 \le i, j \le n_u \ l-d-m \le s \le l-d \quad (47)$$

$$\delta_{ij} = \begin{cases} 1, & \text{for } i = j \\ 0, & \text{for } i \ne j \end{cases} \quad (48)$$

Here, δij is the Kronecker-Delta-function, which is 1 for i=j and 0 for i≠j and i, j denote the input index from 1 to $n_u$.

Figure 4:
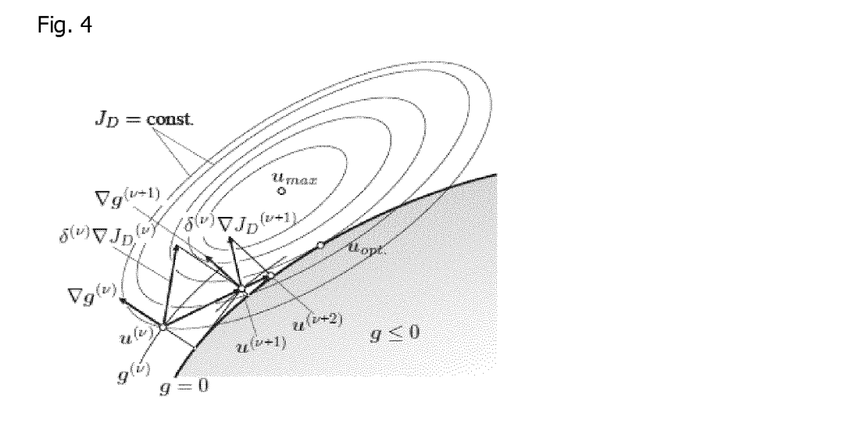
FIG. 4 shows a nonlinear constrained optimization with inequality constraint for a two dimensional input signal u.

The constrained recursive excitation signal optimization is based on the calculation of the gradient (30) with respect to all different inputs $u_i(k)$ with i=1 ... $n_u$ for all observations k= 1 ... N. The compliance to input, input rate and output constraints during the optimization procedure is assured by a constrained gradient method. The principle of the method is explained in FIG. 4 for a two dimensional example. In every iteration (indexed by v) the (quadratic) difference between the gradient $\delta^{(v)}\nabla ij^{(v)}$ D and the excitation signal increment $\Delta u_i$ is minimized while simultaneously the feasible area defined by the constraint vector g≤0 is approached. The constraint vector g=[g1 ... go]∈$\mathbb{R}^{1\times o}$ comprises all possible constraints. A constraint is active if gk=0 and inactive if gk<0. Here, $\delta^{(v)}$ denotes the variable step length of the gradient method. Mathematically the problem is expressed as:

$$(\Delta u_i - \delta^{(v)}\nabla_i J_D^{(v)})^T(\Delta u_i - \delta^{(v)}\nabla_i J_D^{(v)}) \to \min_{\Delta u_i} \quad (49)$$

The linearization of the active constraints g(v)act is given by g(v)lin, which must equal zero:

$$g_{lin}^{(v)T} = (g_{act}^{(v)})^T + \left(\frac{dg_{act}^{(v)}}{du_i}\right)^T \Delta u_i = 0 \quad (50)$$

For the optimization with active constraints a scalar Lagrange function L with the according active multiplier row vector λ(v)act is defined.

$$\mathcal{L}^{(v)} = \frac{1}{2}(\Delta u_i - \delta^{(v)}\nabla_i J_D^{(v)})^T(\Delta u_i - \delta^{(v)}\nabla_i J_D^{(v)}) + +\lambda_{act}^{(v)}g_{lin}^{(v)T} \quad (51)$$

The extremal value of the Lagrange function is obtained where the derivative of L with respect to $\Delta u_i$ equals zero:

$$\frac{d\mathcal{L}^{(v)}}{d\Delta u_i} = \Delta u_i - \delta^{(v)}\nabla_i J_D^{(v)} + \frac{dg_{act}^{(v)}}{du_i}\lambda_{act}^{(v)T} = 0 \quad (52)$$

Then the excitation signal change $\Delta u_i$ is stated as a function of $\lambda_{act}$:

$$\Delta u_i = \delta^{(v)}\nabla_i J_D^{(v)} - \frac{dg_{act}^{(v)}}{du_i}\lambda_{act}^{(v)T} \quad (53)$$

Insertion of this result in the constraint condition (50) gives for $\lambda_{act}$:

$$\lambda_{act}^{(v)T} = \left[\left(\frac{dg_{act}^{(v)}}{du_i}\right)^T\left(\frac{dg_{act}^{(v)}}{du_i}\right)\right]^{-1} \cdot \left[(g_{act}^{(v)})^T + \left(\frac{dg_{act}^{(v)}}{du_i}\right)^T \delta^{(v)}\nabla_i J_D^{(v)}\right] \quad (54)$$

Using the result for λ(v)act and insertion in (53) gives the final result for the iterative excitation signal change $\Delta u_i$.

In the following the active constraints in (50) are treated in detail for input, input rate and output limit violations. Input constraints: Exemplary, it is assumed that the input at the k-th observation exceeds the feasible region defined by [$u_{min}$, $u_{max}$], then the following constraints are active:

$$u_i(k)u_{max}:\Delta u_i(k) - u_{max} + u_i^{(v)}(k) = 0 \quad (55)$$

$$u_i(k)u_{min}:\Delta u_i(k) - u_{min} + u_i^{(v)}(k) = 0 \quad (56)$$

Rate constraints: The adherence of the input rate $\Delta u_{i\ rate}(k) = u_i(k+1) - u_i(k)$ to [$\Delta u_{min}, \Delta u_{max}$] is expressed by the following conditions:

For $\Delta u_{i\ rate}(k) > \Delta u_{max}$:

$$[u_i^{(v)}(k+1) + \Delta u_i(k+1)] - [u_i^{(v)}(k) + \Delta u_i(k)] - \Delta u_{max} = 0 \quad (57)$$

For $\Delta u_{i\ rate}(k) < \Delta u_{min}$:

$$-[u_i^{(v)}(k+1) + \Delta u_i(k+1)] + [u_i^{(v)}(k) + \Delta u_i(k)] + \Delta u_{min} = 0 \quad (58)$$

Figure 5:
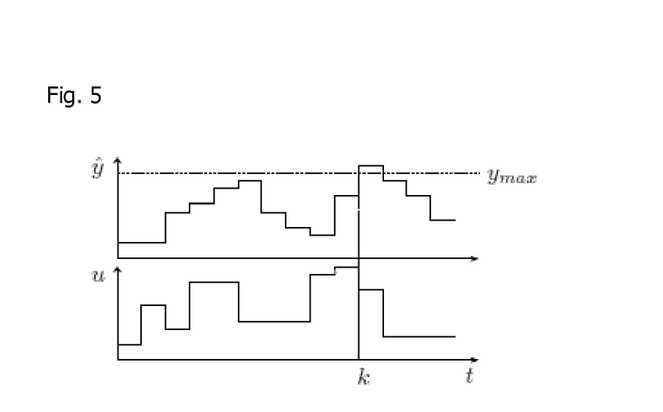
FIG. 5 depicts the excitation signal u and model output $\hat{y}$ with output limit violation $\hat{y}(k) > y_{max}$.

Output constraints: For the incorporation of output constraints it has to be taken account of the fact that for autoregressive systems the input $u_i(k)$ influences all future model outputs ŷ(k+I), I>1. If an output limit violation occurs at the k-th observation, where ŷ(k)>ymax, then the system inputs $u_i(I)$ with I_k have to be modified so that y(k) is in the feasible range, see FIG. 5. This results in the following constraints:

$$\hat{y}(k) > y_{max} : \hat{y}^{(v)}(k) + \frac{d\hat{y}^{(v)}(k)}{du_i^{(v)T}}\Delta u_i - y_{max} = 0 \quad (59)$$

$$\hat{y}(k) > y_{min} : -\hat{y}^{(v)}(k) + \frac{d\hat{y}^{(v)}(k)}{du_i^{(v)T}}\Delta u_i + y_{min} = 0 \quad (60)$$

Equivalent to a model predictive control problem, the calculation of future system inputs has to be made with consideration of the development of future system outputs. This requires the calculation of the derivative of the model output with respect to the dynamic excitation signal, see equation (44).

The following example shows the effectiveness of the proposed method for model based DoE with MLP networks by means of a nonlinear dynamic process. It is shown how the determinant of the Fisher matrix is iteratively improved under the compliance to input, input rate and output constraints. As initial DoE an APRB-signal is generated, which is subsequently enhanced by the application of the presented method. The presented optimization procedure is applied to a (SISO) Wiener model. The Wiener model is described by a serial arrangement of a linear time invariant transfer function G(z-1) and a static nonlinearity NL at the system output.

$$NL: y = \arctan \upsilon \quad (61)$$

Here, the transfer function describes an oscillatory system of second order:

$$G(z^{-1}) = \frac{0.001867z^{-1} + 0.01746z^{-2}}{1 - 1.7826z^{-1} + 0.8187z^{-2}} = \frac{V(z^{-1})}{U(z^{-1})} \quad (62)$$

Figure 6:
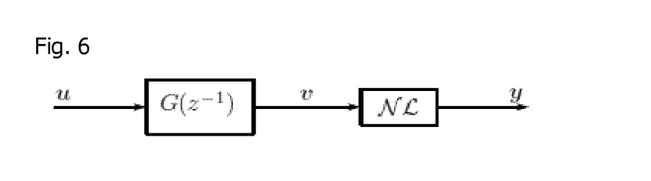
FIG. 6 shows the structure of the Wiener model.
Figure 7:
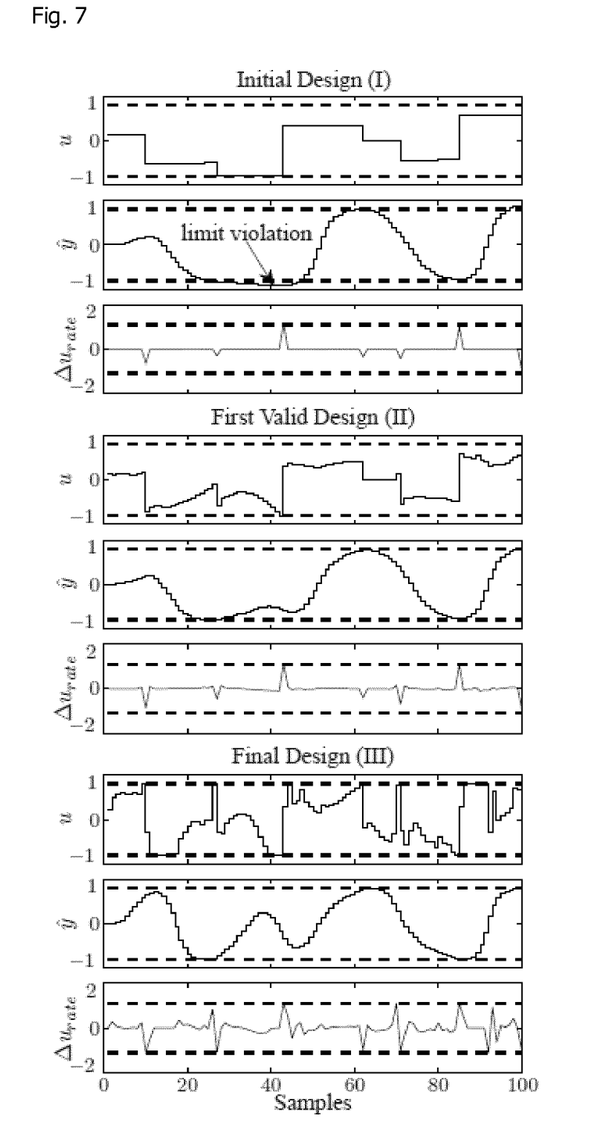
FIG. 7 is an illustration of the excitation signal u, the model output $\hat{y}$ and the input rate_urate with the associated constraints (plotted in dashed lines) for the Initial Design (I), the First Valid Design (II) (all constraints are complied for the first time) and the Final Design (III), whereby the Initial Design exceeds the feasible range (plotted in dashed lines) of the model output.
Figure 8:
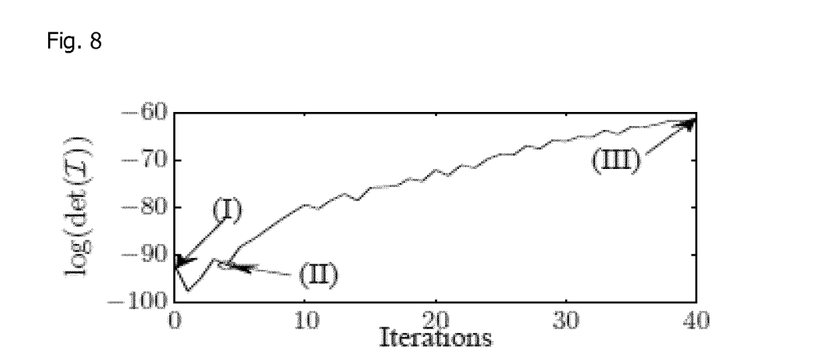
FIG. 8 shows the iterative augmentation of log(det(I)) including the three stages of FIG. 7: Initial Design (I), First Valid Design (II) and Final Design (III).

The generation of output data is done by means of the illustrated Wiener model, as shown in FIG. 6. Then, using a standard tool, e.g. the NNSYSID Toolbox for Matlab, a reference model of the underlying process is trained. In this case, an MLP network with five neurons is already able to approximate the used Wiener model fairly well. As initial DoE for the optimization procedure a state of the art APRB-signal with 100 samples is used. In FIG. 7 the excitation signal u, the input rate $\Delta u_{rate}$ and the model output y together with the associated constraints plotted with dashed lines is depicted for the initial, the first valid and the final design. An initial design, which violates the output constraints was chosen, in order to demonstrate the functionality of the presented constrained optimization procedure. The first valid design is reached when all constraints are the first time complied with. Here, the optimization algorithm is stopped after 40 iterations and the final design is obtained. In FIG. 8, the associated iterative augmentation of the logarithm of the determinant of the Fisher matrix is depicted. The determinant of the Fisher matrix decreases in the first iteration since the output limit violation of the initial DoE has to be compensated and in the fourth iteration the first valid design is reached. The augmentation of the determinant of the Fisher matrix causes an increased excitation of the system output dynamics as shown in FIG. 7. This is a reasonable result because more information is gathered if the system is excited in the whole output range. The increase of the information content of the excitation signal is equivalent to a reduction of the parameter uncertainty of estimated model parameters.

By the present invention, a novel method for multilayer perceptron based DoE for nonlinear dynamic systems is proposed. The motivation for this work is the creation of an analytical batch procedure for the optimization of dynamic excitation signals with compliance to input, input rate and output constraints, which is required for an online DoE procedure. The effectiveness of the proposed concept for model based DoE is demonstrated on a nonlinear dynamic system by the illustration of the iterative augmentation of the determinant of the Fisher matrix, which results in a reduction of the parameter uncertainty of the estimated model parameters. The simulation example showed that the optimization of the information content of excitation signal leads to augmented system output dynamics. The presented method for excitation signal optimization also complies with input, input rate and output constraints, which is a prerequisite for an online DoE procedure.

The invention claimed is:

1. A machine-implemented method for obtaining data from a nonlinear dynamic real system during a test run comprising:
   a) providing a sequence of dynamic excitation signals for at least one measurement channel according to a current design of experiment for said test run,
   b) obtaining model output data by feeding said sequence of excitation signals of said current design of experiment into a model for the real system, said model comprising nonlinear dynamic models,
   c) determining a criterion for the information content of the complete sequence of excitation signals of said current design of experiment
   d) varying a totality of the sequence of excitation signals of the current design of experiment so that said criterion is improved, in order to generate a new design of experiment with a new sequence of excitation signals,
   e) iteratively repeating steps b) to d) for a number of iterations, each iteration proceeding according to the new sequence of excitation signals,
   f) obtaining, from a final iteration of the number of iterations, a final design of experiment including a final generated sequence of excitation signals;
   g) conducting the test run of the real system using the final generated sequence of excitation signals, and
   h) measuring output data from the real system for the at least one measurement channel during the test run with the final generated sequence of excitation signals.

2. The method according to claim 1, wherein during each iteration, compliance with constraints on the excitation signals and/or the model output data is checked, whereby in case of non-compliance, the sequence of excitation signals is modified in a way that compliance is restored and the criterion is improved.

3. The method according to claim 1, wherein after each iteration, a derivative of the criterion with respect to the dynamic excitation signal is determined, and the iterations are stopped as soon as said derivative falls beneath a predetermined value or a predetermined number of iterations is reached.

4. The method according to claim 1, wherein for each iteration a spatial distribution of design points and a temporal progression of the excitation signal is optimized.

5. The method according to claim 1, wherein the criterion is determined from the Fisher information matrix, in particular by calculating the trace of the inverse of said matrix, by calculating the determinant or the smallest eigenvalue.

6. The method according to claim 1, wherein the model output data are determined with a model using Multilayer Perceptron Networks (MLP) as the nonlinear dynamic model architecture.

7. The method according to claim 1, wherein the model output data are determined with a model using a Local Model Network (LMN) or a Takagi-Sugeno Fuzzy Model as the nonlinear dynamic model architecture.

* * * * *